United States Patent
Yamaguchi (10) Patent No.: US 6,507,136 B1
(45) Date of Patent: Jan. 14, 2003

(54) ECCENTRIC COMMUTATOR FOR VIBRATOR MOTOR

(75) Inventor: Tadao Yamaguchi, Isesaki (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 0 days.

(21) Appl. No.: 09/474,095

(22) Filed: Dec. 29, 1999

(30) Foreign Application Priority Data

Jan. 29, 1999 (JP) ........................... 11-022438
Mar. 15, 1999 (JP) ........................... 11-068270

(51) Int. Cl.[7] ................. H02K 47/28; H02K 13/04; H02K 7/06
(52) U.S. Cl. .................. 310/128; 310/237; 310/81
(58) Field of Search .................. 310/128, 127, 310/129–147, 233, 237, 231, 219, DIG. 6, 71, 81; 200/140 A; 29/597

(56) References Cited

U.S. PATENT DOCUMENTS

| | | | |
|---|---|---|---|
| 5,036,239 A | * 7/1991 | Yamaguchi | 310/268 |
| 5,107,155 A | 4/1992 | Yamaguchi | 310/81 |
| 5,341,057 A | 8/1994 | Yamaguchi et al. | 310/81 |
| 5,793,133 A | * 8/1998 | Shiraki et al. | 310/81 |
| 5,942,833 A | * 8/1999 | Yamaguchi | 310/268 |
| 6,011,333 A | * 1/2000 | Yamaguchi et al. | 310/81 |
| 6,051,900 A | * 4/2000 | Yamaguchi | 310/81 |
| 6,169,348 B1 | * 1/2001 | Won | 310/81 |

FOREIGN PATENT DOCUMENTS

| | | |
|---|---|---|
| JP | 2294482 | 12/1990 |
| JP | 2309070 | 12/1990 |
| JP | 6-81443 | 10/1994 |
| JP | 8-331788 | 12/1996 |
| JP | 9-23611 | 1/1997 |
| JP | 9-37495 | 2/1997 |
| JP | 9-182364 | 7/1997 |
| JP | 9-182365 | 7/1997 |
| JP | 9261918 | 10/1997 |
| JP | 10-52018 | 2/1998 |

* cited by examiner

Primary Examiner—Dang Dinh Le
(74) Attorney, Agent, or Firm—Leydig, Voit & Mayer, Ltd.

(57) ABSTRACT

A compact flat type vibrator motor is provided in which movement of the center is secured in the commutator itself, an additional eccentric member does not need to be provided, and the number of parts are reduced, so that mass production is possible. The commutator pieces are located in a commutator base member including a printed wiring board having a portion to which a high density resin of a specific gravity of 3 or more is added. A shaft receiving portion is centrally located in the commutator base member. The high density resin portion is eccentric so that an eccentric rotor is formed.

7 Claims, 8 Drawing Sheets

ECCENTRIC COMMUTATOR FOR VIBRATOR MOTOR

BACKGROUND OF THE INVENTION

1. Field of the Invention

The present invention relates to an eccentric commutator used as a silent call device for a mobile communications apparatus and an improvement in assembly and structure of a compact vibrator motor using the eccentric commutator.

2. Description of the Related Art

Figure 8:
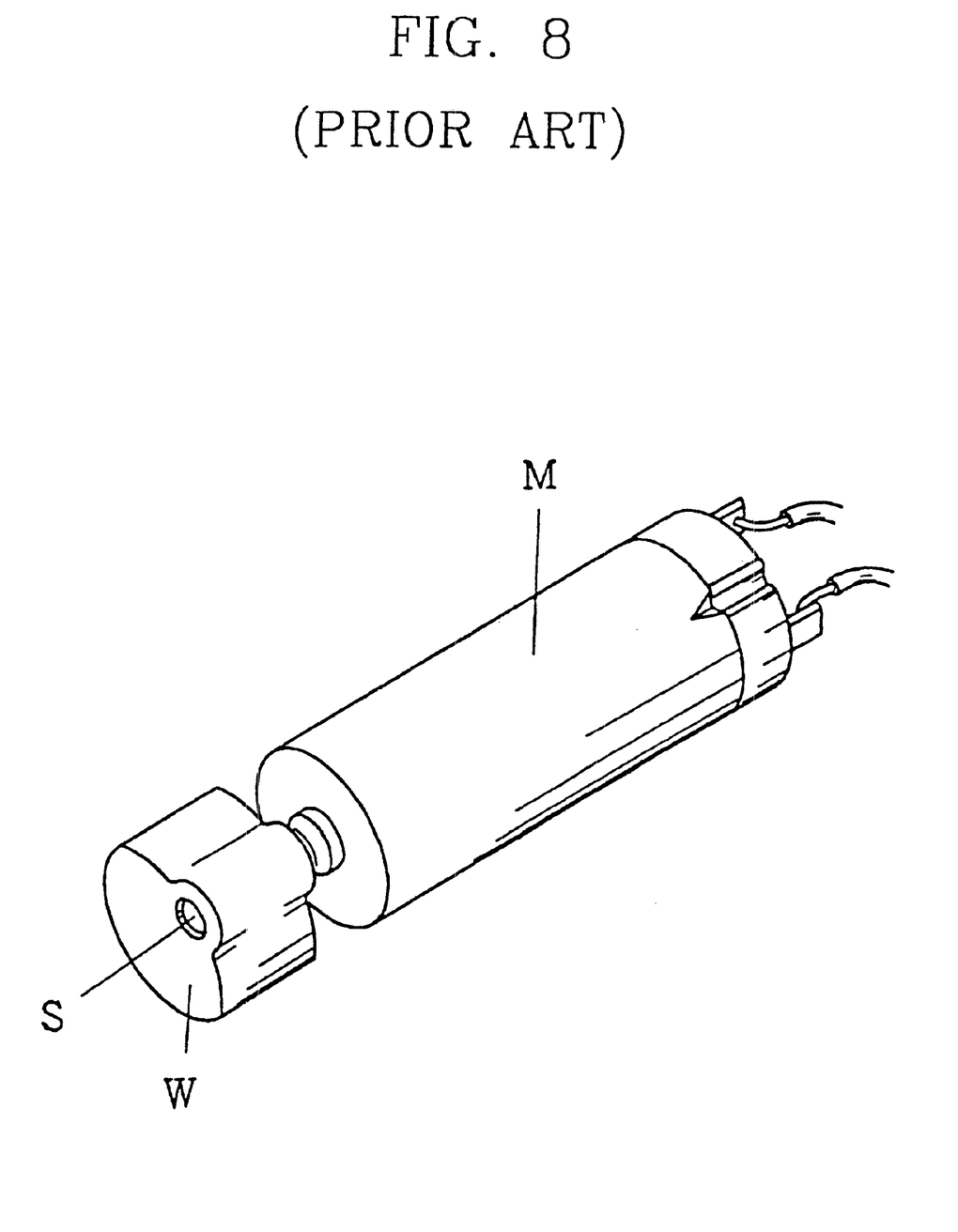
FIG. 8 is a perspective view showing a conventional compact vibrator motor.

Conventionally, as a silent call device for pagers or mobile phones, as shown in FIG. 8, an eccentric weight W formed of tungsten alloy is coupled to an output shaft S of a cylindrical DC motor M. During rotation of the motor M, vibrations are generated due to the difference in centrifugal force of the eccentric weight W.

However, as the above addition of the eccentric weight W to the output shaft S requires a space for rotation of the eccentric weight W in an apparatus such as a pager, there is a limit in designing the apparatus. Also, use of the expensive tungsten alloy increases the production costs.

Thus, the present applicant has suggested a cylindrical coreless vibrator motor in Japanese Patent Application No. Hei 2-309070 and the corresponding U.S. Pat. No. 5,107,155, in which a built-in rotor itself is made eccentric excluding an output shaft. The above motor having no output shaft and no eccentric weight is favorably noticed by the market as there is no limit in design, use thereof is easy and there is no danger during rotation. However, as the motor requires three cylindrical coreless coils, the number of parts or processing steps increases.

In order to make a rotor with an iron core itself vibrate instead of the cylindrical coreless coil type core, the present applicant has suggested removing one of three salient pole type iron cores as disclosed in Japanese Patent Application No. Hei 2-294482. The above two salient pole type iron cores are preferable in the case of a motor such as a massager needing a relatively large amount of output. However, for a portable apparatus such as a portable terminal consuming a low voltage, movement of the center of mass is little and the amount of vibration is insufficient.

Also, as disclosed in U.S. Pat. No. 5,341,057, the present applicant has suggested a compact vibrator motor having an eccentric armature iron core which is formed by arranging a rotor in which three salient poles made of magnetized material are distributed at one side, to face a tetrapolar field magnet having four alternate north and south pole sections. Also, the same technical concept has been disclosed in Japanese Laid-open Patent Application No. Hei 9-261918. However, as the three armature iron cores made of magnetized material are distributed at one side and cogging torque (a force of being absorbed by a field magnet) increases in the case of the motor, the gap of the motor needs to be enlarged and the diameter of the motor itself cannot be reduced.

In the above motor having a built-in type eccentric rotor, as the size of the above motor is reduced, the distance between armature coils decreases. Thus, connection of an end portion of the armature coil to the commutator without damage to the armature coil is very difficult. Particularly, when a printed circuit board is used as a flat panel commutator as it is, where the end portion of the armature coil is directly welded thereon, welding of the end portion is not easy because the end portion is easily detached from a printed pattern due to an elastic force of the end portion.

Also, as the commutator itself is generally a balanced circular shape, the number of parts such as an additional eccentricity emphasizing member increases in the built-in type eccentric rotor.

SUMMARY OF THE INVENTION

To solve the problems described, it is an objective of the present invention to provide an eccentric commutator for a vibrator motor with connection terminals that extend beyond air-core armature coils so that assembly of the vibrator motor and connection of the air-core armature coils is simplified in manufacturing the vibrator motor.

According to one aspect of the invention, an eccentric commutator includes a commutator base member comprising a printed wiring plate; a plurality of commutator pieces on a first side of the commutator base member; a resin shaft receiving portion, having a through-hole into which a shaft rotatably supporting the commutator base member is to be inserted, supporting the commutator base member, located partially on a second side of the commutator base member, passing through the commutator base member, and protruding to and partially located on the first side of the commutator base member; air-core armature coil position determination fixation fitting wedges located on the second side of the commutator base member, beyond the resin shaft receiving portion; at least two air-core armature coils fixed to the second side of the commutator base member on the air-core armature coil position determination fixation fitting wedges, each air-core armature coil having first and second ends; a resin portion positioned between the air-core armature coils, and eccentric relative to the resin shaft receiving portion, the resin portion including a resin and a metal component and having a specific gravity of at least 3; and air-core armature coil end connection terminals located outside the air-core armature coils, on the commutator base member, and respectively connected to the first and second ends of each air-core armature coil.

According to another aspect of the invention, an eccentric commutator includes a commutator base member comprising a printed wiring plate; a plurality of commutator pieces on a first side of the commutator base member; a resin shaft receiving portion, having a through-hole into which a shaft rotatably supporting the commutator base member is to be inserted, supporting the commutator base member, passing through the commutator base member, located partially on a second side of the commutator base member, protruding to and partially located on the first side of the commutator base member, and having a dynamic frictional coefficient of no more than 0.4 (1.5 kg/cm$^2$); air-core armature coil position determination fixation fitting wedges located on the second side of the commutator base member, beyond the resin shaft receiving portion; at least two air-core armature coils fixed to the second side of the commutator base member on the air-core armature coil position determination fixation fitting wedges, each air-core armature having first and second ends; a resin portion positioned between the air-core armature coils and eccentric relative to the resin shaft receiving portion, the resin portion including a resin and a metal component and having a specific gravity of at least 3; and air-core armature coil end connection terminals located outside the air-core armature coils, on the commutator base member, and respectively connected to the first and second ends of each air-core armature coil.

It is a second objective of the present invention to provide an eccentric commutator in which intensity of a commutator member having a particular shape is secured.

It is a third objective of the present invention to provide a structure of an eccentric commutator in which connection of each end is easy because an end connection portion is separated from an armature coil.

It is a fourth objective of the present invention to provide an eccentric commutator which can receive a shaft as it is.

It is a fifth objective of the present invention to provide a vibrator motor using the above eccentric commutator, which needs less parts and is low in cost.

The above objectives can be achieved, by an eccentric commutator made by forming a plurality of commutator pieces on a commutator base member formed as a printed wiring plate, in which high density resin having a specific gravity of 3 or more is added to at least a part of the commutator base member and a shaft receiving portion is simultaneously is provided at the center thereof by making at least the high density resin portion to be eccentric.

It is preferred in the present invention that the high density resin has a specific gravity of 5 through 12 and is provided with a shaft receiving portion having a lubricating component at the central portion thereof.

It is preferred in the present invention that the commutator base member is formed to be a non-circular shape viewed from a plane and is formed by making an extension portion incorporated with the commutator piece to be eccentric.

It is preferred in the present invention that the commutator base member is used to reinforce the high density resin portion.

It is preferred in the present invention that the extension portion incorporated with the commutator piece protrudes from the commutator base member to be a connection terminal portion, and that the connection terminal portion has a notch at a position opposite to the center of mass so as not to overlap the armature coil, when shown in a plane view.

It is preferred in the present invention that the commutator base member exhibits a slipping feature of a dynamic frictional coefficient of 0.4 (1.5 kg/cm$^2$) or less, and has a sliding resin portion having a shaft receiving hole at the center thereof.

The eccentric commutator can be manufactured by forming a plurality of connected commutator base members, each of which is formed of a printed wiring board, collectively setting the connected commutator base members to a mold, and integrally forming the eccentric commutators by making high density resin having a specific gravity of 3.5 or more to be eccentric.

A flat type coreless vibrator motor having the eccentric rotor comprises an eccentric commutator and a plurality of armature coils arranged in the eccentric commutator.

It is preferred in the present invention that the eccentric rotor is formed by arranging integrally a plurality of air-core armature coils by using a position determination guide arranged in the eccentric commutator.

According to the invention, a compact vibrator motor which does not need an additional eccentric member can be provided, as the center of mass can be moved in the commutator itself.

According to the invention, the amount of eccentricity can be increased.

According to the invention, an eccentric commutator having strength is possible.

According to the invention, as the connection portion is separated from the armature coil, soldering can be easily performed.

According to the invention, a special shaft receiving portion is not needed.

According to the invention, an eccentric commutator can be manufactured in mass and inexpensively.

According to the invention, an eccentric rotor can be easily configured.

According to the invention, the position of an air-core armature coil can be accurately determined and the air-core armature coil can be firmly fixed.

BRIEF DESCRIPTION OF THE DRAWINGS

The above objectives and advantage of the present invention will become more apparent by describing in detail preferred embodiments thereof with reference to the attached drawings in which.

DETAILED DESCRIPTION OF THE INVENTION

Figure 1:
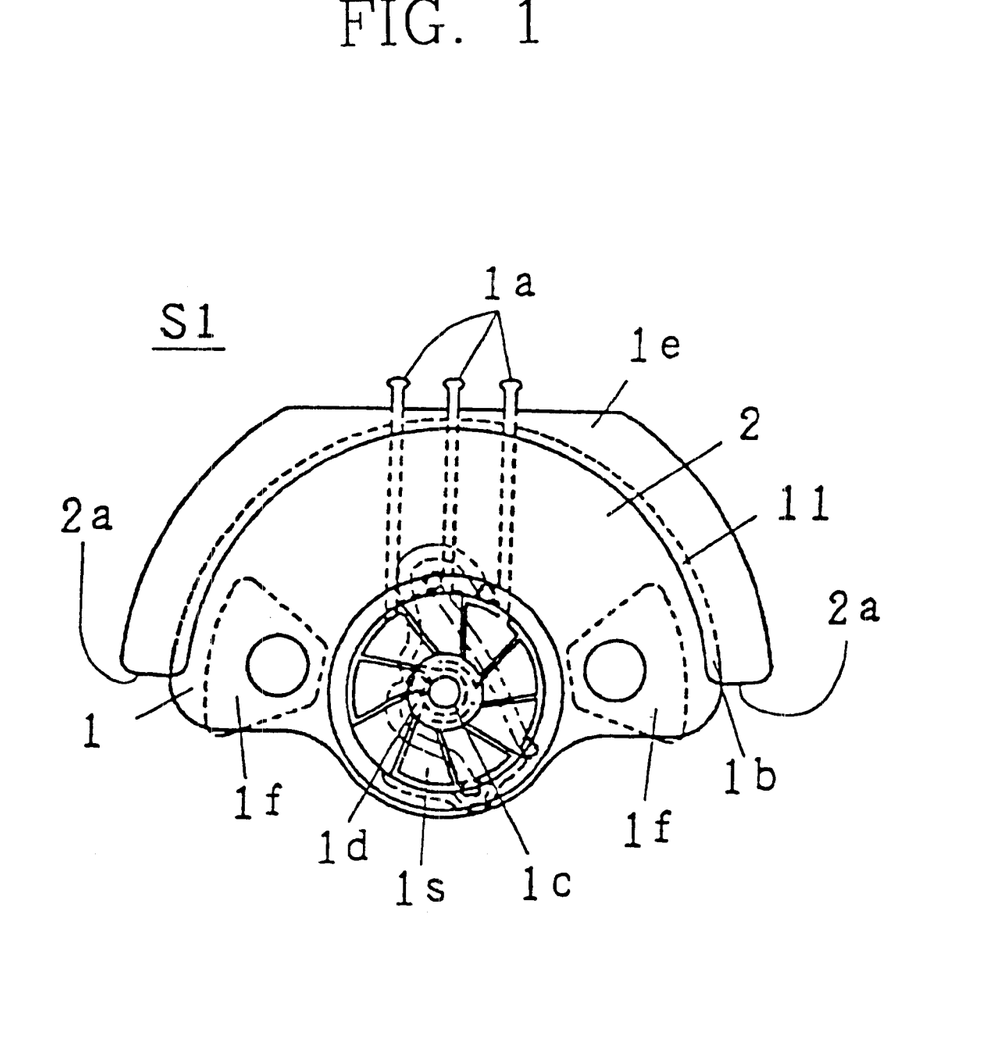
FIG. 1 is a plan view showing an eccentric commutator according to a first preferred embodiment of the present invention.

In FIG. 1, reference numeral 1 denotes an eccentric commutator base member formed of a printed wiring board which has an expanded fan shape. To encompass the eccentric commutator base member 1, an eccentric commutator S1 is configured by an integrally formed high density, highly slippery resin 2 having a specific gravity of 6 and a half-moon shape. Nine commutator pieces 1s provided with slanted slits for preventing sparking are arranged in the eccentric commutator base member 1. Armature coil end connection terminals 1a which will be described later are extended from three commutator pieces in a center movement portion, protruding from a half-moon shaped base. Also, the eccentric commutator base member 1 is extended by a reinforcement portion 1b to the inside of half-moon shaped ends 2a formed of high density, highly slippery resin 2. Every two commutator pieces 1s are shorted using a surface and a through hole on a rear surface thereof based on the principle of rotation. A shaft receiving hole 1c is formed at the center of the eccentric commutator S1 and the eccentric commutator base member 1 is maintained by a bank portion 1d formed of the high density, highly slippery resin 2. In the eccentric commutator 1 having the above structure, a second bank portion 1e is further provided at a half-moon shaped outer circumferential portion thereof for the movement of the center of mass. Air-core armature coil position determination fixation fitting wedges 1f which will be described later are integrally formed with the high density, highly slippery resin 2 and arranged within an open angle of 160° as indicated by a dashed line at the rear of the nine commutator pieces 1s.

The high density, highly slippery resin 2 having a specific gravity of 6 has a volume resistance of about 9 kΩ as it binds metal powder with polyamide. Thus, as resistance is provided between the commutator pieces, spark prevention is achieved.

Figure 2:
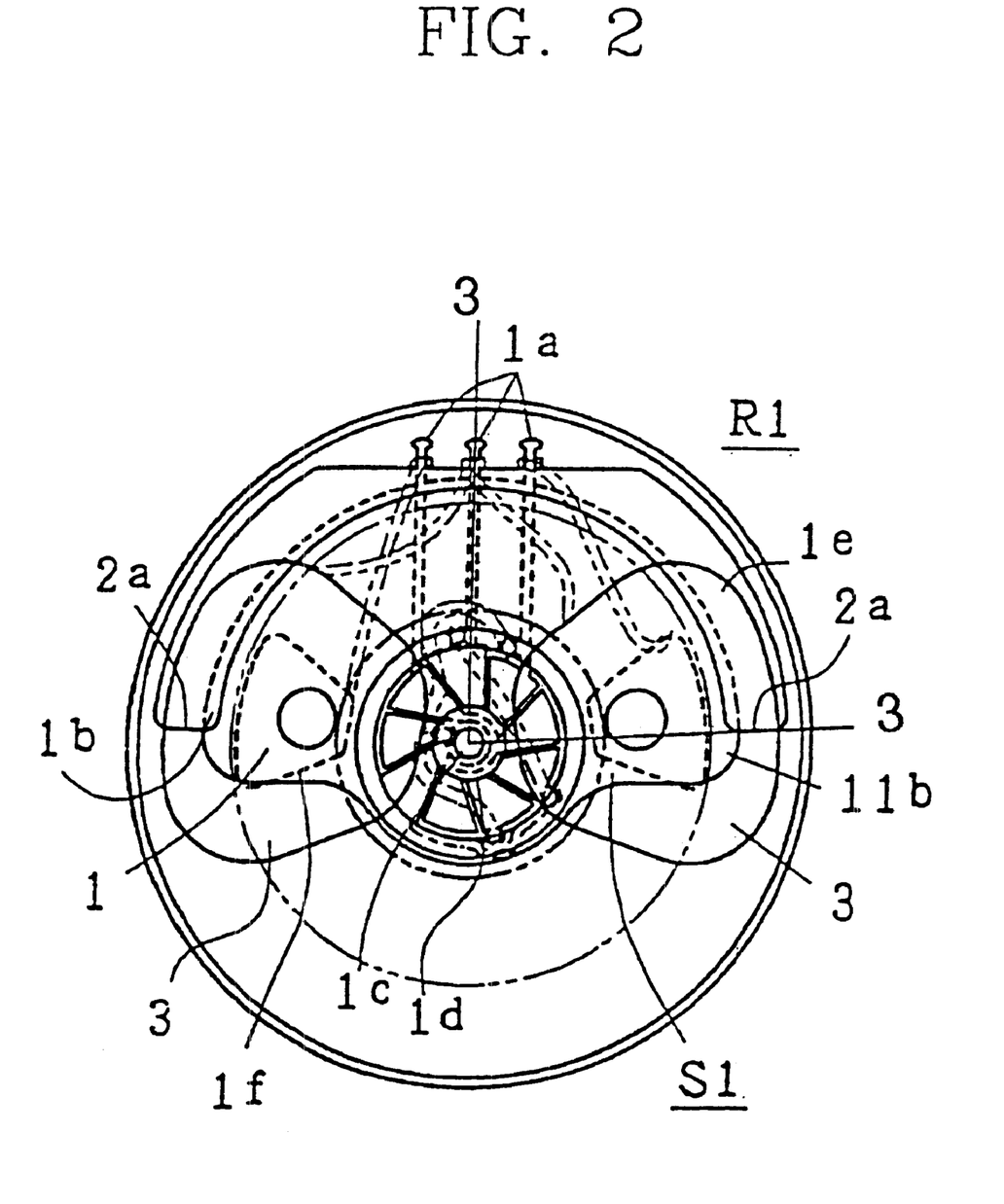
FIG. 2 is a plan view a flat panel coreless vibrator motor using the eccentric commutator of FIG. 1.
Figure 3:
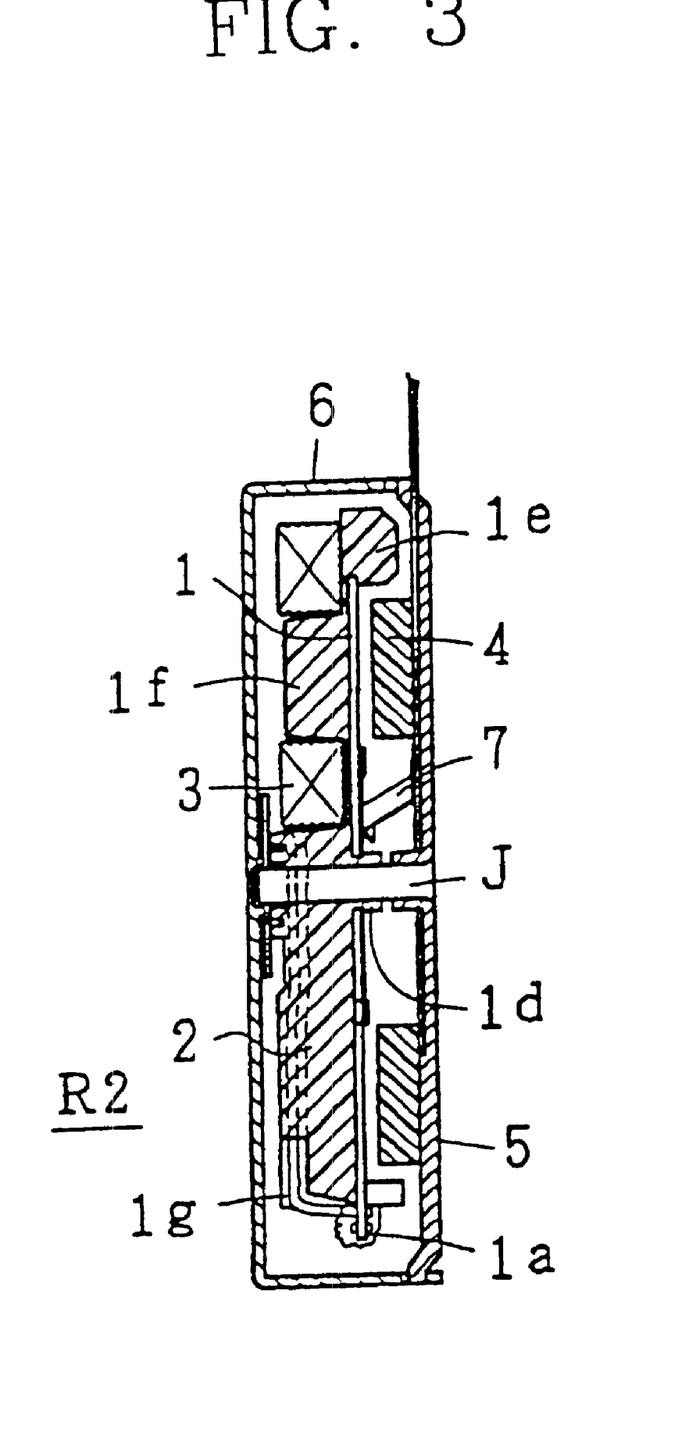
FIG. 3 is a sectional view of the motor, taken along lines 3—3 of FIG. 2.

In a description of a first preferred embodiment of a flat panel coreless vibrator motor using the above eccentric commutator, referring to FIGS. 2 and 3, air-core armature coils 3 formed by winding a welding wire itself about the eccentric commutator, are inserted in the air-core armature coil position determination fixation fitting wedges 1f and wound thereabout. The ends of completely wound coils 3 are wound around the armature coil end connection terminals 1a through predetermined grooves 1g so as to be within the thickness of a rotor and are dip-soldered to form an eccentric rotor R1. Preferably, the air coil armature coils 3 are fixed by a reflow of powdered or solid epoxy. The flat panel coreless vibrate motor provided with such an eccentric rotor R1 is of a shaft directional gap type, and the eccentric rotor is driven by a flat magnet 4.

Reference numeral 5 denotes a bracket formed of a tin alloy steel plate for maintaining the magnet 4 and concurrently being a magnetic path, which constitutes a housing with a case 6. A shaft J fixed to the center of the bracket 5 is rotatably installed through the shaft receiving hole 1c of the eccentric commutator S1. As a pair of brushes 7 provided at the bracket 5 are allowed to sliding-contact the eccentric commutator S1 at an open angle of 180°, electric power is supplied to the armature coils 3.

Figure 4:
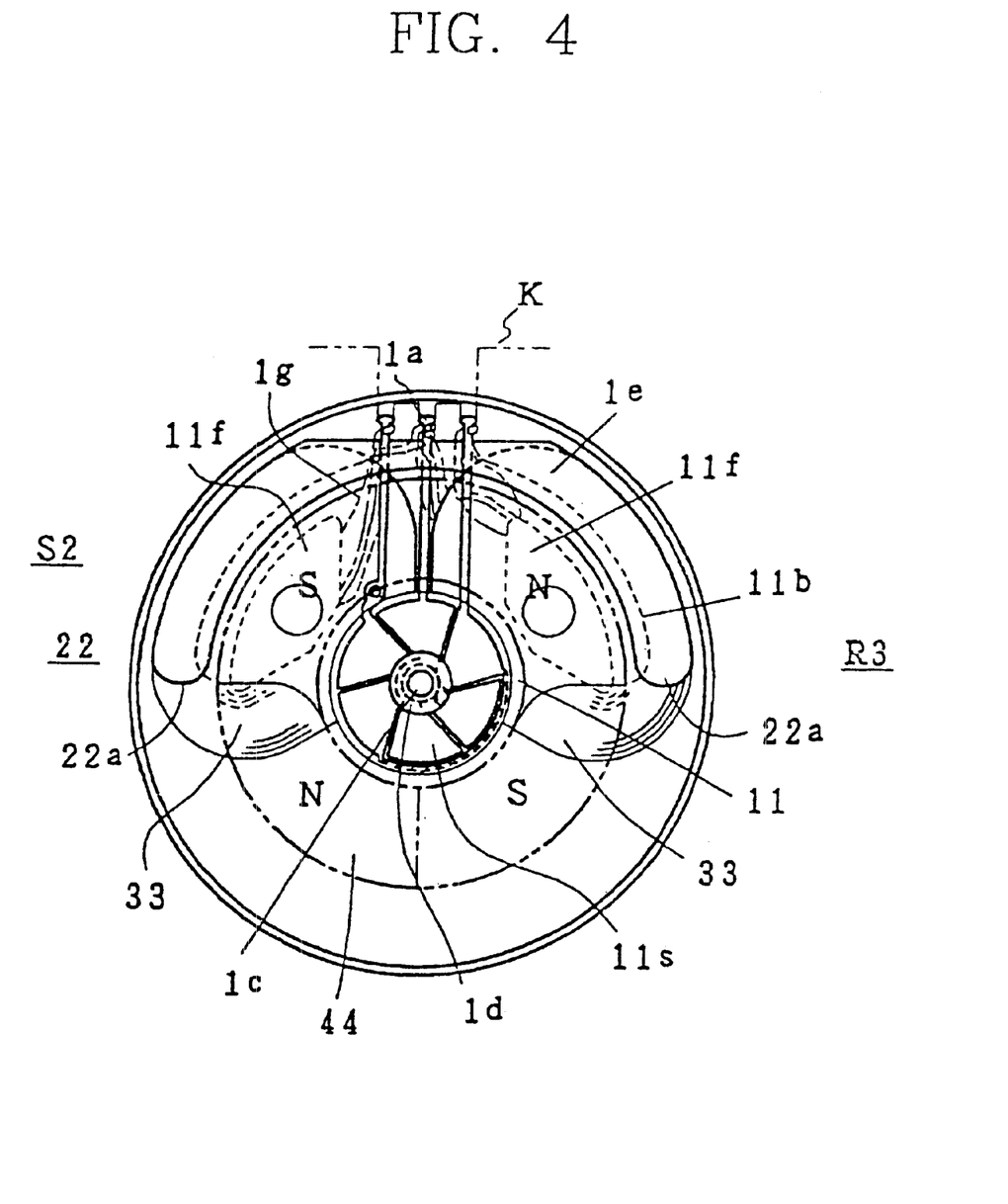
FIG. 4 is a plan view showing the inside of a vibrator motor using an eccentric commutator according to a second preferred embodiment of the present invention.

FIG. 4 shows an eccentric commutator according to a second preferred embodiment of the present invention. Here, reference numeral 11 denotes an eccentric commutator base member formed of a printed wiring board which is an expanded fan shape. To encompass the eccentric commutator base member 11, an eccentric commutator S2 is configured by an integrally formed high density, highly slippery resin 22 having a specific gravity of 6 and a half moon shape. Six commutator pieces 11s provided with slanted slints for preventing sparking are arranged in the eccentric commutator base member 11. Armature coil end connection terminals 1a which will be described later are extended from three commutator pieces in a center movement portion, protruding from a half-moon shaped base. Also, the eccentric commutator base member 11 is extended by a reinforcement portion 11b to the inside of half-moon shaped ends 22a formed of high density, highly slippery resin 22. Adjacent commutator pieces 11s are shorted with each other using a surface and a through hole on a rear surface thereof based on the principle of rotation. A shaft receiving hole 1c is formed at the center of the eccentric commutator S2 and the eccentric commutator base member 11 is maintained by a bank portion id formed of the high density, highly slippery resin 22. In the eccentric commutator 11 having the above structure, a second bank portion 1e is further provided at a half-moon shaped outer circumferential portion thereof for the movement of the center. Air-core armature coil position determination fixation fitting wedges 11f, which will be described later, are integrally formed with the high density, highly slippery resin 22 and arranged within an open angle of 120° as indicated by a dashed line at the rear of the six commutator pieces 11s. The air-core armature coils 33 formed by winding a welding wire thereabout, are inserted in the air-core armature coil position determination fixation fitting wedges 11f and wound thereabout. The ends of completely wound coils 33 are wound around the armature coil end connection terminals 1a through predetermined grooves 1g so as to be within the thickness of a rotor and are dip-soldered to form an eccentric rotor R2.

Figure 5:
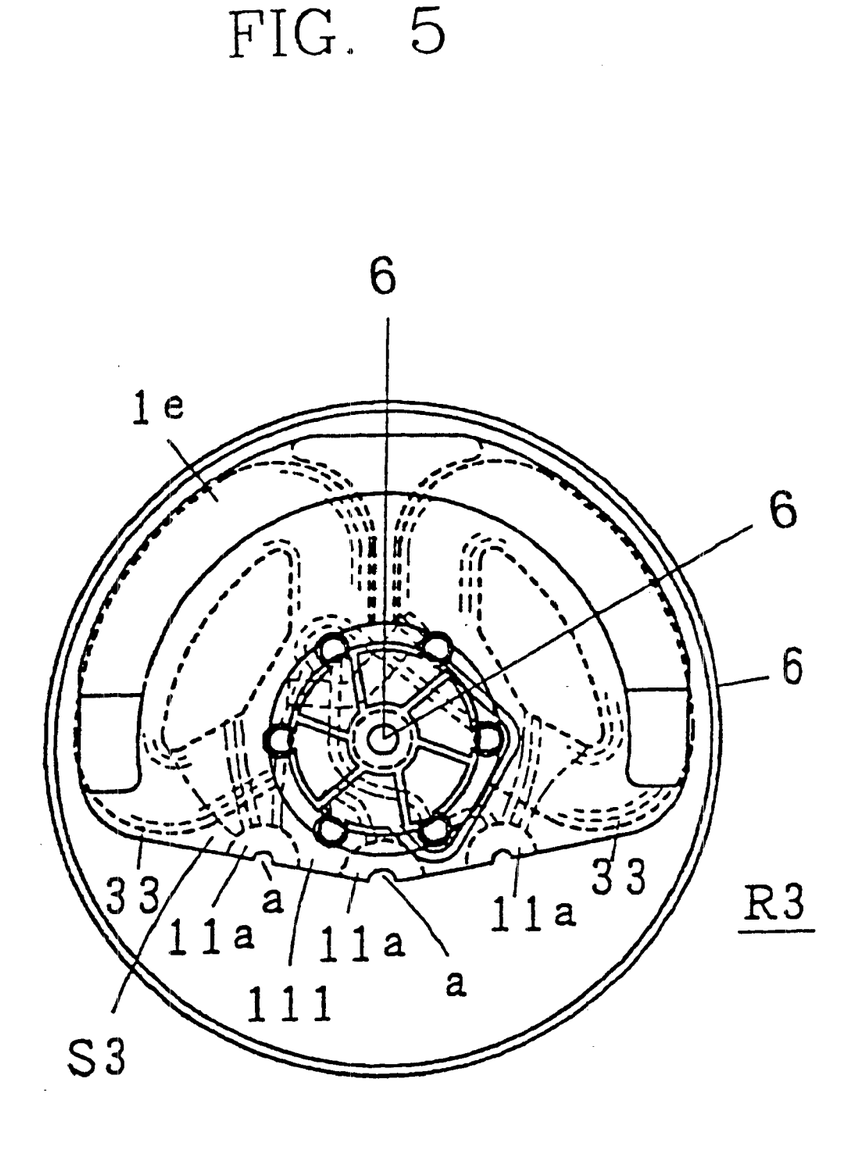
FIG. 5 is a plan view showing the inside of a vibrator motor using an eccentric commutator according to a third preferred embodiment of the present invention.
Figure 6:
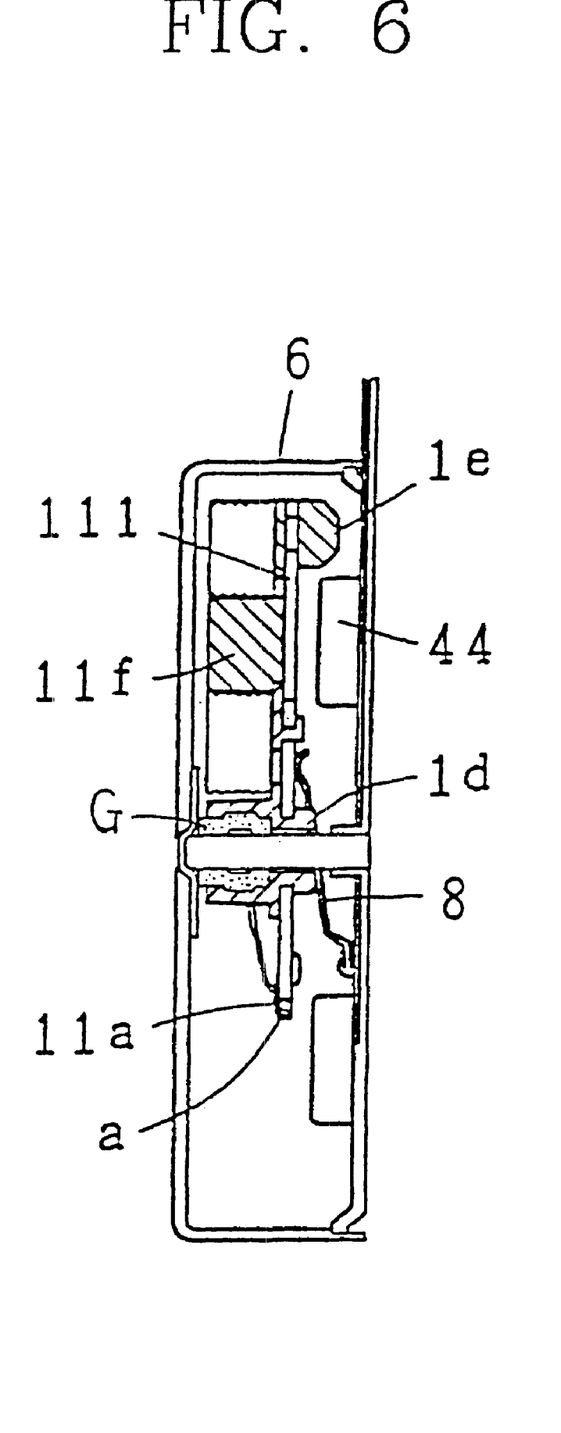
FIG. 6 is a section view taken along lines 6—6 of FIG. 5.

FIGS. 5 and 6 show a vibrator motor using an eccentric commutator according to a third preferred embodiment of the present invention which is a modification of the vibrator motor of FIG. 4. A base 111 of an eccentric commutator S3 is formed to have a shape of slightly larger than the half moon (when shown in a plane view). The armature coil end connection terminals 11a are provided at the opposite side of the center of mass, unlike the above embodiments. Notches a are provided at the armature coil end connection terminals 11a for connection. The positions of the armature coil end connection terminals 11a, which are not overlapped with the air-core armature coils 33, make the connection of ends easy.

As the structure of other elements are the same as those of the first and second preferred embodiments, the same elements are designated with the same reference numerals so that description thereof will be omitted. However, a sliding contact open angle between brushes 8 is 90° and a magnet includes four poles of alternating N and S polarity are attached to a magnet 44.

As the high density (specific gravity), highly slippery resin, resin having a specific gravity of 3 through 10 is selected considering the balance between a high specific gravity feature and a slipping feature. In the case of a motor having a diameter of 14 mm used for a portable telephone, resin having a specific gravity of about 5 is preferable. Also, to secure the movement of center of mass, resin having a specific gravity of about 12 may be used. In this case, however, as the amount of metal powder increases, volume resistance becomes about 400Ω so that a spark suppressing feature becomes superior. In this case, however, the slipping feature deteriorates. Accordingly, it is preferred to incorporate an additional bearing member G, as shown in FIG. 6, for example, a bearing made of a highly slippery resin having other lubricating components or a bearing including porous metal, at the central portion of the shaft receiving portion.

A spark suppressing effect increases as the volume resistance becomes lower. When the volume resistance becomes at 200Ω or less, current consumption increases, while the spark quenching effect decreases at 100 KΩ or more. Also, although the above embodiments all describe a star type connection, a delta type connection is possible by changing the position of a brush or the position of magnetic pole of a field magnet.

As a means for determining the position of the air-core armature coil in the commutator base member, a guide insertion hole fitting for the inner diameter of the air-core armature coil can be punched in the commutator base member.

Figure 7:
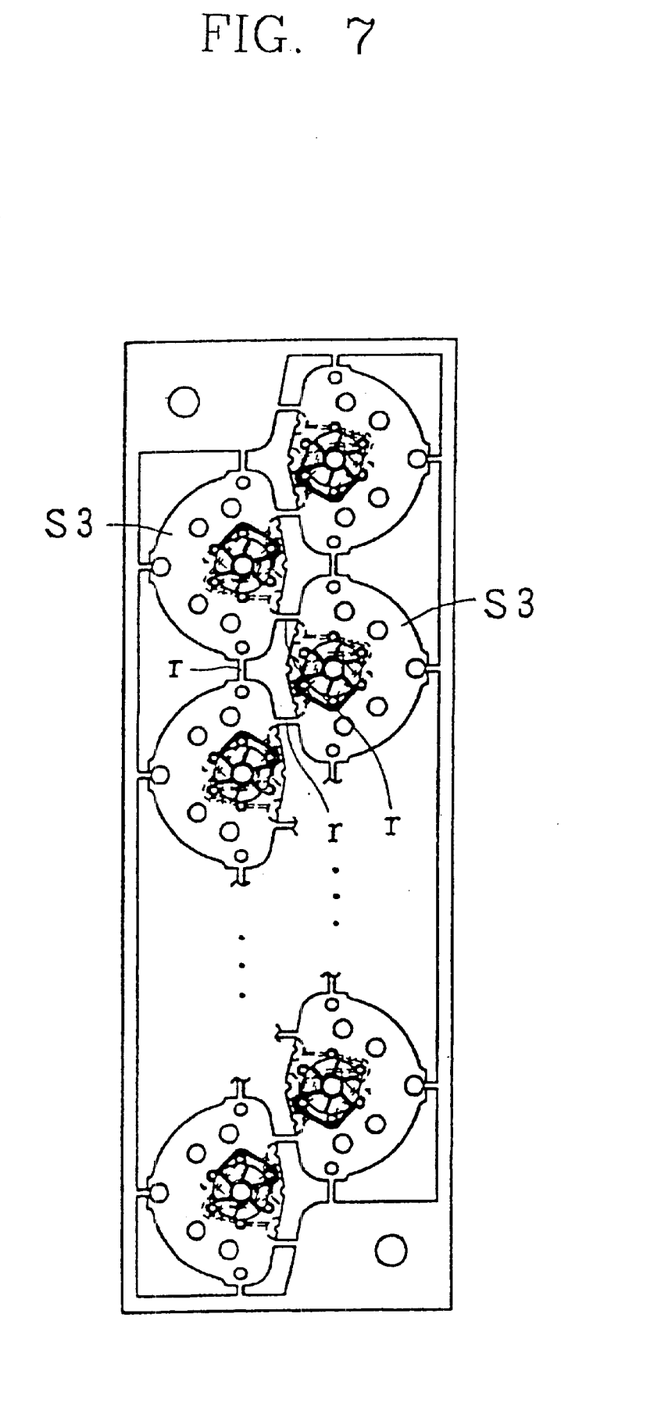
FIG. 7 is plan view for explaining a method of manufacturing the eccentric commutator.

FIG. 7 is a view for explaining a method of manufacturing the eccentric commutator of FIG. 5. Ten bases 111 of the eccentric commutator S3 are formed in two connected rows and set, as they are, for injection molding. By integrally forming the base 111 with a high density, highly slippery resin having a specific gravity of 6, a connected eccentric commutator group is formed and separated, as it is, into each eccentric commutator. Alternately, the connected eccentric commutator group is separated into individual eccentric commutators after the air-core armature coils 33 are distributed and attached thereon, so that eccentric commutators with eccentric rotor assemblies are manufactured. It is obvious that such a manufacturing method can be used for the above other embodiments.

As described above, in the eccentric commutator and the compact vibrator motor using the eccentric commutator according to the present invention having the above structure, as an additional eccentric member is not needed, the movement of the center of mass can be secured in the commutator itself. Also, when each armature coil is made of a non-mold type, shorting can be prevented in the armature coil formed by a thin wire. Further, as each armature coil and the end connection. portion are separated from each other, connecting the end to the commutator is easy and the commutator can be easily attached.

In particular, the following effects are provided.

A compact vibrator motor which does not need an additional eccentric member can be provided, as the center can be moved in the commutator itself.

According to the invention, the amount of eccentricity can be increased.

According to the invention, an eccentric commutator having intensity is possible.

According to the invention, as the connection portion is separated from the armature coil, soldering can be easily performed.

According to the invention, a special shaft receiving portion is not needed.

According to the invention, an eccentric commutator can be manufactured in mass and inexpensively.

According to the invention, an eccentric rotor can be easily configured.

According to the invention, the position of an air-core armature coil can be accurately determined and the air-core armature coil can be firmly fixed.

What is claimed is:

1. An eccentric commutator including:
   a commutator base member comprising a printed wiring plate;
   a plurality of commutator pieces on a first side of the commutator base member;
   a resin shaft receiving portion, having a through-hole into which a shaft rotatably supporting the commutator base member is to be inserted, supporting the commutator base member, located partially on a second side of the commutator base member, passing through the commutator base member, and protruding to and partially located on the first side of the commutator base member;
   air-core armature coil position determination fixation fitting wedges located on the second side of the commutator base member, beyond the resin shaft receiving portion;
   at least two air-core armature coils fixed to the second side of the commutator base member on the air-core armature coil position determination fixation fitting wedges, each air-core armature coil having first and second ends;
   a resin portion positioned between the air-core armature coils, and eccentric relative to the resin shaft receiving portion, the resin portion including a resin and a metal component and having a specific gravity of at least 3; and
   air-core armature coil end connection terminals located outside the air-core armature coils, on the commutator base member, and respectively connected to the first and second ends of each air-core armature coil.

2. The eccentric commutator as claimed in claim 1, wherein the commutator base member has a non-circular shape.

3. The eccentric commutator as claimed in claim 2, wherein the commutator base member has a dynamic frictional coefficient of no more than 0.4 (1.5 kg/cm$^2$), and has a sliding resin portion having a shaft receiving hole at the center of the commutator base member.

4. The eccentric commutator as claimed in claim 1, wherein
   the air-core armature coil position determination fixation fitting wedges are located on the second side of the commutator base member and connected to the resin shaft receiving portion,
   the resin shaft receiving portion is connected to a circumference of the commutator base member and protrudes in an axial direction toward the first side of the commutator base member for reinforcement, and
   the air-core armature coils are positioned at the air-core armature coil position determination fixation fitting wedges without molding.

5. The eccentric commutator as claimed in claim 1, wherein the commutator base member is a slippery resin having a dynamic frictional coefficient of not more than 0.4 (1.5 kg/cm$^2$).

6. The eccentric commutator as claimed in claim 1, further comprising a bearing member at a central portion of the resin shaft receiving portion.

7. An eccentric commutator including:
   a commutator base member comprising a printed wiring plate;
   a plurality of commutator pieces on a first side of the commutator base member;
   a resin shaft receiving portion, having a through-hole into which a shaft rotatably supporting the commutator base member is to be inserted, supporting the commutator base member, passing through the commutator base member, located partially on a second side of the commutator base member, protruding to and partially located on the first side of the commutator base member, and having a dynamic frictional coefficient of no more than 0.4 (1.5 kg/cm$^2$);
   air-core armature coil position determination fixation fitting wedges located on the second side of the commutator basemember, beyond the resin shaft receiving portion;
   at least two air-core armature coils fixed to the second side of the commutator base member on the air-core armature coil position determination fixation fitting wedges, each air-core armature having first and second ends;
   a resin portion positioned between the air-core armature coils and eccentric relative to the resin shaft receiving portion, the resin portion including a resin and a metal component and having a specific gravity of at least 3; and
   air-core armature coil end connection terminals located outside the air-core armature coils, on the commutator base member, and respectively connected to the first and second ends of each air-core armature coil.

* * * * *